(12) United States Patent
Adachi et al.

(10) Patent No.: US 10,209,094 B2
(45) Date of Patent: Feb. 19, 2019

(54) ROTATION DETECTION SENSOR AND RESIN MOLDING DIE FOR THE SENSOR

(71) Applicant: AISIN SEIKI KABUSHIKI KAISHA, Kariya-shi, Aichi (JP)

(72) Inventors: Kazuhiro Adachi, Chita-gun (JP); Koji Kawasaki, Kariya (JP)

(73) Assignee: AISIN SEIKI KABUSHIKI KAISHA, Kariya-shi, Aichi (JP)

( * ) Notice: Subject to any disclaimer, the term of this patent is extended or adjusted under 35 U.S.C. 154(b) by 79 days.

(21) Appl. No.: 15/117,932

(22) PCT Filed: Oct. 16, 2014

(86) PCT No.: PCT/JP2014/077577
§ 371 (c)(1),
(2) Date: Aug. 10, 2016

(87) PCT Pub. No.: WO2015/145841
PCT Pub. Date: Oct. 1, 2015

(65) Prior Publication Data
US 2016/0356627 A1    Dec. 8, 2016

(30) Foreign Application Priority Data
Mar. 24, 2014 (JP) .................. 2014-059694

(51) Int. Cl.
B29C 45/14    (2006.01)
G01D 5/12    (2006.01)
(Continued)

(52) U.S. Cl.
CPC ......... *G01D 5/12* (2013.01); *B29C 45/14065* (2013.01); *G01D 11/245* (2013.01);
(Continued)

(58) Field of Classification Search
CPC ................ B29C 45/14065; B29C 2045/14122
(Continued)

(56) References Cited

U.S. PATENT DOCUMENTS 6,155,114 A    12/2000    Karino et al.
2006/0260418 A1    11/2006    Tsuge

FOREIGN PATENT DOCUMENTS

JP    54-62088 U    5/1979
JP    2000-097955 A    4/2000
(Continued)

OTHER PUBLICATIONS

International Search Report of PCT/JP2014/077577 dated Jan. 20, 2015 [PCT/ISA/210].
(Continued)

*Primary Examiner* — Robert B Davis
(74) *Attorney, Agent, or Firm* — Sughrue Mion, PLLC

(57) ABSTRACT

Provided is a rotation detection sensor and a resin molding die for the sensor, with which manufacturing cost can be readily reduced. The sensor includes an assembly type sensor body having a sensor element and a cable electrically connected to the sensor element. A curved portion is formed at a portion of the cable extending from the sensor body. There is provided a resin sheath portion molded to sheath a portion of the sensor body and the curved portion integrally with resin.

3 Claims, 8 Drawing Sheets

(51) Int. Cl.
  *G01P 1/02* (2006.01)
  *G01P 3/487* (2006.01)
  *G01D 11/24* (2006.01)

(52) U.S. Cl.
  CPC .............. *G01P 1/026* (2013.01); *G01P 3/487* (2013.01); *B29C 2045/14122* (2013.01)

(58) Field of Classification Search
  USPC ......................................................... 425/112
  See application file for complete search history.

(56) References Cited

FOREIGN PATENT DOCUMENTS

JP      2006-322875 A    11/2006
WO    WO-2015075915 A1 *  5/2015  ....... B29C 45/14426

OTHER PUBLICATIONS

Written Opinion of PCT/JP2014/077577 dated Jan. 20, 2015 [PCT/ISA/237].
Communication dated Nov. 21, 2017 from the Japanese Patent Office in counterpart application No. 2014-059694.

* cited by examiner

ROTATION DETECTION SENSOR AND RESIN MOLDING DIE FOR THE SENSOR

CROSS REFERENCE TO RELATED APPLICATIONS

This application is a National Stage of International Application No. PCT/JP2014/077577 filed Oct. 16, 2014, claiming priority based on Japanese Patent Application No. 2014-059694 filed Mar. 24, 2014, the contents of all of which are incorporated herein by reference in their entirety.

TECHNICAL FIELD

This disclosure relates to a rotation detection sensor mounted for e.g. detecting a rotational state of a wheel, etc. of an automobile. The disclosure relates also to a resin molding die for the sensor.

BACKGROUND ART

Patent Document 1 discloses a rotation detection sensor including an assembly type sensor body having a sensor element and a cable electrically connected to the sensor element, wherein a curved portion is formed at a portion of the cable extending from the sensor body and a resin sheath portion sheaths a portion of the sensor body and the curved portion with resin.

The sheath portion sheathing a portion of the sensor body and the curved portion with rein is formed by separately molding a primary molded portion configured to protect electric connection between the sensor element and the cable, a secondary molded portion configured to sheath the primary molded portion having a portion thereof accommodated in a housing and a portion of the cable extending from the primary molded portion together with the housing for prevention of intrusion of e.g. water to the connecting portion between the sensor element and the cable or the sensor element, and a tertiary molded portion configured to sheath the secondary sheath portion and to hold the cable extending from the secondary molded portion under a bent state thereof.

PRIOR-ART DOCUMENT

Patent Document

Patent Document 1: Japanese Unexamined Patent Application No. 2006-322875

SUMMARY

Problem to be Solved by Disclosure

In the conventional rotation detection sensor described above, the sheath portion sheathing a portion of the sensor body and the curved portion with rein is formed by separately molding three molded portions, i.e. the primary molded portion, the secondary molded portion and the tertiary molded portion.

Therefore, the manufacturing process of the rotation detection sensor is troublesome, so that manufacturing cost reduction tends to be difficult to achieve.

The present disclosure has been made in view of the above-described state of the art and aims at providing a rotation detection sensor and a resin molding die for the sensor, with which manufacturing cost can be readily reduced.

Solution

According to a characterizing feature of a rotation detection sensor relating to this disclosure, the rotation detection sensor includes an assembly type sensor body having a sensor element and a cable electrically connected to the sensor element; wherein a curved portion is formed at a portion of the cable extending from the sensor body and there is provided a resin sheath portion molded to sheath a portion of the sensor body and the curved portion integrally with resin.

With the rotation detection sensor having the above arrangement, since the cable extending from the sensor body has a curved portion, there is provided greater degree of freedom when this rotation detection sensor is to be attached to various kinds of devices. Further, with the rotation detection sensor having the above arrangement, for the curved portion formed at a portion of the the assembly type sensor body and the cable portion extending from this sensor body, the resin sheath portion can be formed by one-time molding operation. Thus, the manufacturing steps can be reduced, so that manufacturing cost reduction can be readily achieved.

According to a further characterizing feature of the present disclosure, of the resin sheath portion sheathing the cable, at a position thereof excluding a position intersected by a plane including a cable centerline of the curved portion, there is formed a recess as a mark formed by holding of the cable at the time of molding.

With the above-described feature that a recess as a mark formed as a result of holding of the cable at the time of molding is formed at a position thereof excluding a position intersected by a plane including a cable centerline of the curved portion, it is possible to secure a resin sheath having a predetermined thickness at the portion of the sheath portion intersected by the plane including the cable centerline of the curved portion. Therefore, there can be obtained a rotation detection sensor having high durability with ensuring bending rigidity of the sheath portion at the curved portion.

According to a still further characterizing feature of the present disclosure, the recesses are formed on opposite sides across the curved portion along an extending direction of the cable in the resin sheath portion.

The above arrangement that the recesses are provided on opposite sides across the curved portion means that fixing of the curved portion was effected reliably at the time of resin molding. In the course of manufacture of the rotation detection sensor of this disclosure, the cable is bent by a predetermined curvature. In this, the cable will experience elastic or plastic deformation, thus leading to build-up of its inside pressure. With the above-described arrangement, the shape of the curved portion is fixed by holding of the front/rear opposite sides of this curved portion. Therefore, at the time of resin molding, it is possible to allow the resin charged to the curved portion to set (coagulate) in a stable manner.

Moreover, as the shape of the curved portion is fixed during the resin molding, no inadvertent bending force or the like will be applied to the cable portion extending from the curved portion to the sensor body. Thus, no damage will occur at e.g. the connecting portion of the cable relative to the sensor body. Thus, a robust rotation detection sensor can be obtained.

According to a still further characterizing feature of this disclosure, an engaging portion for preventing positional displacement of the sensor body at the time of molding is formed at a portion of the sensor body where the resin sheath portion is not formed.

With this arrangement, positional displacement of the sensor body at the time of molding of the sheath portion can be prevented, without forming a positional displacement preventing mark for the sensor body in the resin sheath portion, that is, without inviting deterioration of strength of the sheath portion.

According to a characterizing feature of a resin molding die relating also to the present disclosure, the molding die comprises:

a first molding die configured to clamp and fix a leading end portion of an assembly type sensor body having a sensor element and a cable electrically connected to the sensor element;

second and third molding dies that enclose a base end portion of the sensor body and that can be clamped and separated to/from each other and that both can be clamped to the first molding die so as to form a cavity for charging resin to the base end portion and an outer circumferential portion of the cable; and a fourth molding die that is clamped to the second and third molding dies clamped to each other to form a curved portion of the cable, the fourth molding die forming the cavity in cooperation with the second molding die and the third molding die, the fourth molding die clamping a portion of the cable further extending from the curved portion in cooperation with the second molding die.

According to the resin molding die having the above-described arrangement, the base end portion of the assembly type sensor body whose leading end portion is fitted and fixed in the first molding die is enclosed in the second and third molding dies that can be clamped and separated to/from each other and can also be clamped to the first molding die, so that a cavity for charging resin to the base end portion and the outer circumferential portion of the cable can be formed.

Further, as the fourth molding die is clamped to the second and third molding dies that are clamped to each other, a curved portion of the cable can be formed. Also, as the cavity for charging resin to the outer circumferential portion of the cable is formed together with the second molding die and the third molding die, the portion of the cable further extending from the curved portion can be clamped with the second molding die.

With the above, a portion of the assembly type sensor body and the curved portion of the cable can be sheathed by the resin sheath portion molded by one-time molding operation, without needing to form the curved portion of the cable in advance. Thus, the manufacturing cost reduction can be easily achieved.

According to a still further feature of this disclosure:

the second molding die and the third molding die have a first holding portion configured to hold straight a portion of the cable which extends from the sensor body;

the third molding die has a second holding portion configured to hold the cable with application of a bending force thereto such that the curved portion is formed by a side of the cable which extends further from its portion held by the first holding portion; and the fourth molding die has a third holding portion configured to hold the cable with application of a bending force thereto at a portion thereof further extending from the portion held by the second holding portion.

With this arrangement, when the second molding die and the third molding die are clamped to each other, the portion of the cable extending from the sensor body is held straight by the first holding portion; and at the same time, the portion of the cable further extending from the portion thereof held by the first holding portion is held with application of a bending force thereto so as to form the curved portion.

And, when the fourth molding die is clamped to the second molding die and the third molding die, a bending force is applied to the cable on the side thereof further extending from the portion held by the second holding portion with the application of the bending force, whereby the curved portion of the cable can be formed inside the cavity formed by the second through fourth molding dies.

As a result, the curved portion can be formed with high accuracy inside the cavity, without needing to form the curved portion of the cable in advance.

According to a still further feature of this disclosure, the first through third holding portions are configured to come into abutment to positions in the cable excluding a position thereof intersected by a plane including a cable centerline of the curved portion.

With the above arrangement, the recesses which are marks formed as result of holding of the cable by the first through third holding portions are not formed at positions intersected by the plane including the cable centerline of the curved portion. Consequently, reduction in the bending rigidity of the sheath portion at the portions intersected by the plane including the cable centerline of the curved portion is avoided, such that strength improvement can be achieved.

According to a still further characterizing feature of this disclosure, there is provided an engaging member engageable/disengageable to/from an engaging portion formed in the sensor body, the engaging member being projectable/retractable from/into the first molding die when the leading end portion of the sensor body is fitted and fixed into the first molding die.

With the above arrangement, by engaging the engaging member to the engaging portion formed in the sensor body at the time of molding of the sheath portion, positional displacement of the sensor body at the time of die molding can be prevented.

EMBODIMENTS

Next, embodiments of the present disclosure will be explained with reference to the drawings.

FIGS. 1-6 show a rotation detection sensor A according to this disclosure configured to detect a rotational sate of a wheel mounted on a vehicle such as an automobile.

Figure 1:
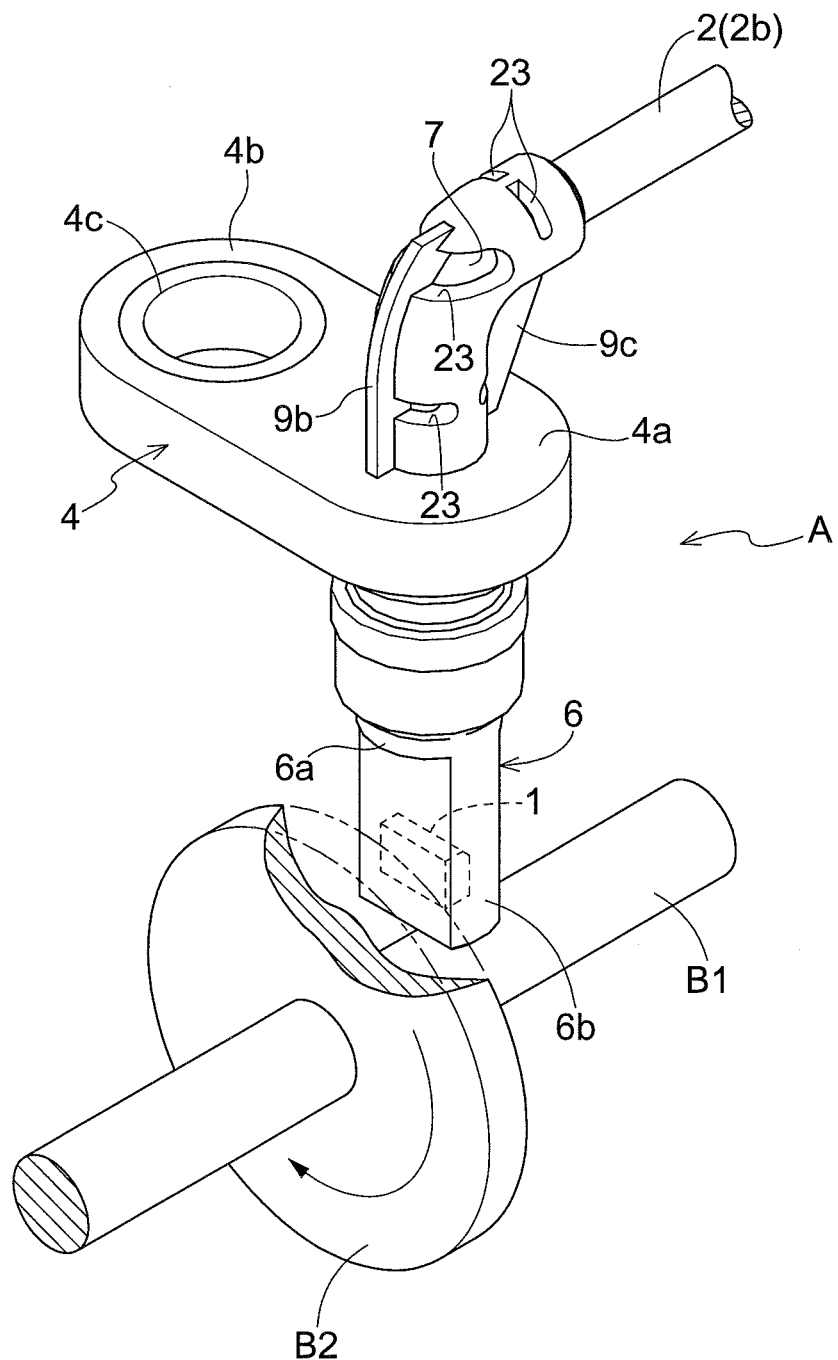
FIG. 1 is a perspective view showing a use mode of a rotation detection sensor.

The rotation detection sensor A, as shown in FIG. 1, is fixed in opposition to a lateral end face of a magnetized rotor B2 fixed coaxially with an axle B1. The magnetized rotor B2 has its lateral end face magnetized to N pole and S pole in alternation along a circumferential direction. As the rotation detection sensor A detects change in magnetic flux which occurs in association with rotation of the magnetized rotor B2 with the axle B1, a rotational speed of the axle B1, namely, a traveling speed of the vehicle, can be detected.

The rotation detection sensor A, as shown in FIGS. 2-6, comprises an assembly type sensor body 3 including a sensor element 1 (hall IC) and a cable 2 electrically connected to the sensor element 1 and is insert-molded in a molded portion 4 integrally formed of a resin such as a plastic.

Figure 2:
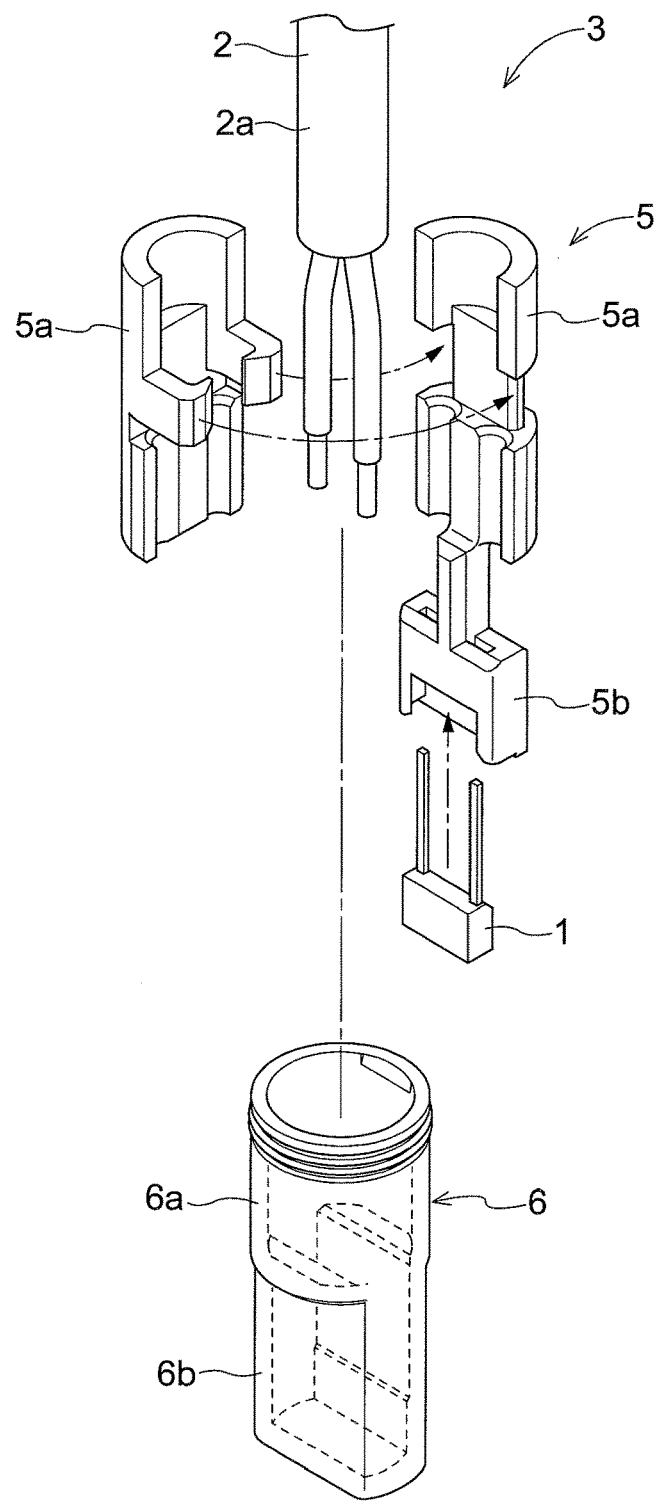
FIG. 2 is an exploded perspective view of a sensor body.

The sensor body 3, as shown in FIG. 2, includes a holder 5 with the sensor element 1 assembled thereto and a case 6 for accommodating the holder 5 therein.

The holder 5, as a bar-like member elongate in a vertical direction, includes, on an upper end side thereof, a pair of cable clamping portions 5a for clamping a cable 2 and includes, on a lower end side thereof, a sensor holding portion 5b for holding the sensor element 1.

The case 6 includes a cylindrical portion 6a having an opening at its top and a box-like sensor element accommodating portion 6b provided continuously from a lower portion of the cylindrical portion 6a.

The holder 5 is accommodated in the case 6 with inserting the sensor holding portion 5b into the sensor element accommodating portion 6b.

The molded portion 4 integrally includes a resin sheath portion 4a (to be referred to as the "sheath portion 4a" hereinafter) sheathing a length portion of the cable 2 extending from the sensor body 3 together with a portion of this sensor body 3 and a fixing support portion 4b provided with a bolt fixing portion 4c to be fixed to the vehicle.

The length portion of the cable 2 extending from the sensor body 3 includes a curved portion 7 forming a second straight portion 2b curved in L-shape relative to a first straight portion 2a extending from the holder 5 of the sensor body 3.

Therefore, the sheath portion 4a is molded to sheath a portion of the sensor body 3 and the curved portion 7 integrally with resin.

Figure 3:
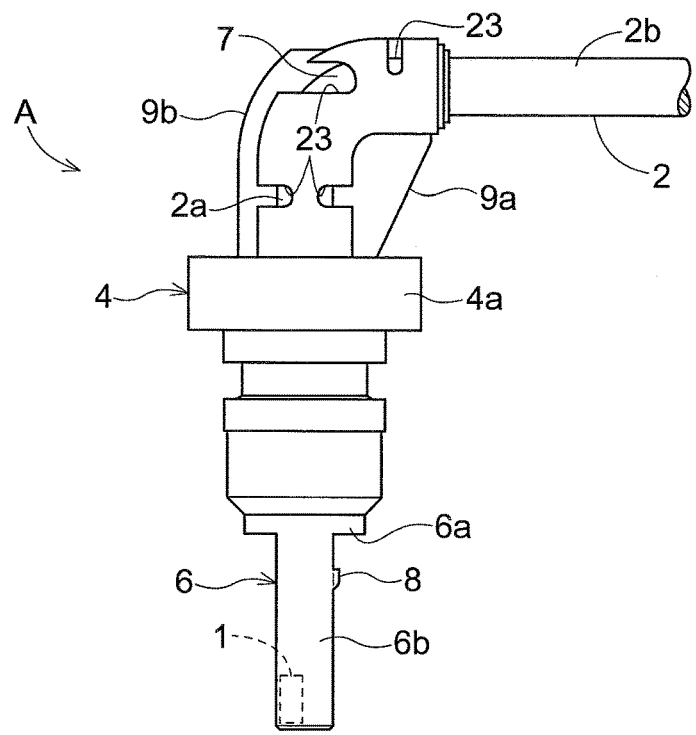
FIG. 3 is a side view of the rotation detection sensor.
Figure 4:
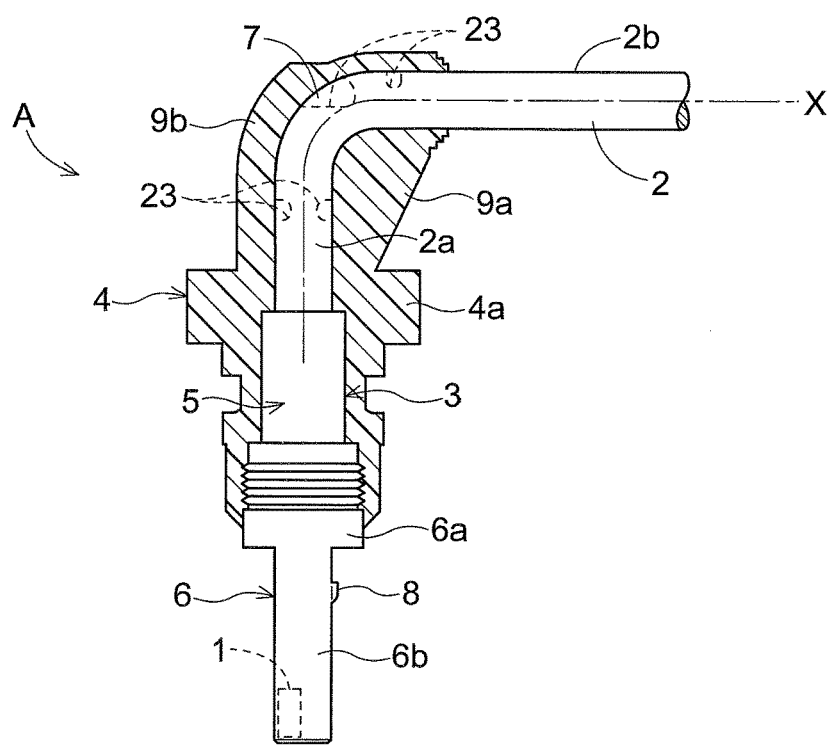
FIG. 4 is a side view in section of the rotation detection sensor.
Figure 5:
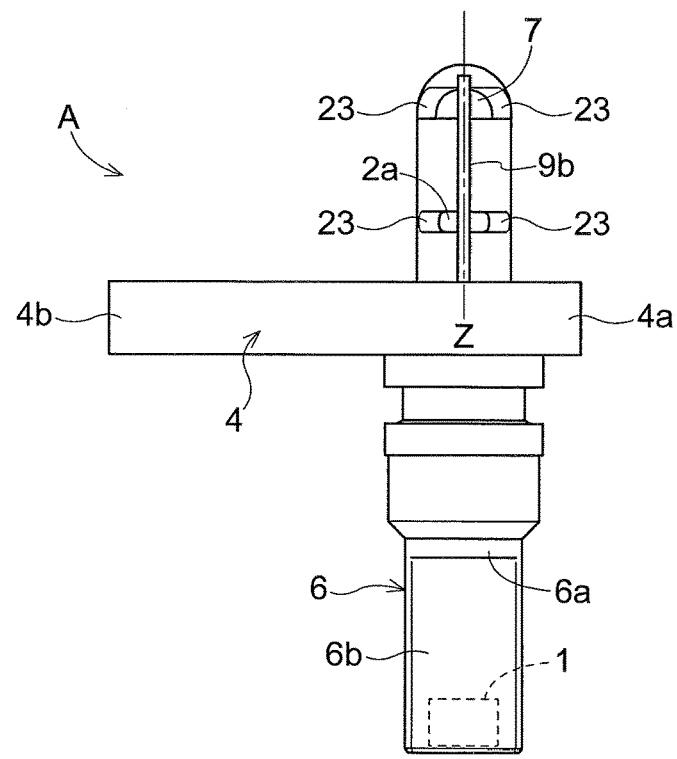
FIG. 5 is a front view of the rotation detection sensor.
Figure 6:
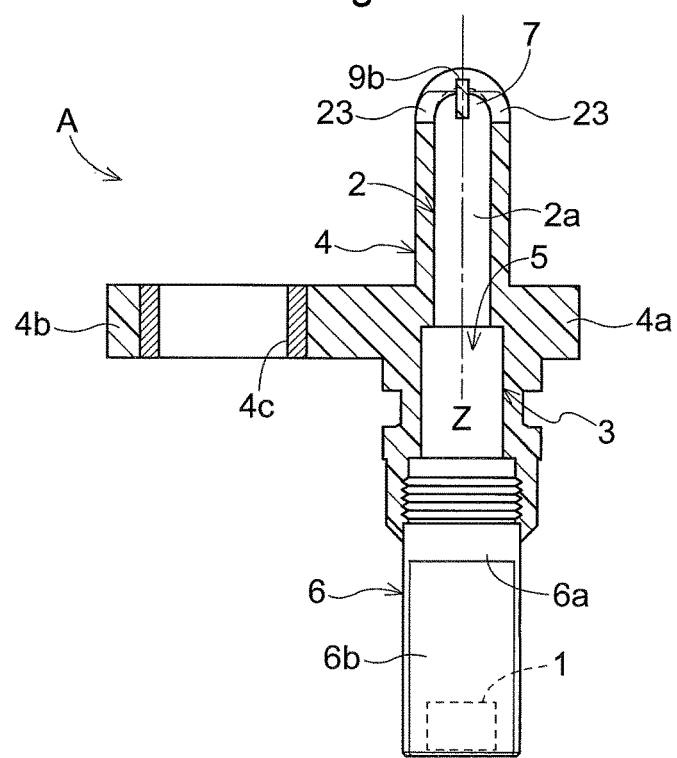
FIG. 6 is a front view in section of the rotation detection sensor.

As shown in FIG. 3 and FIG. 4, in the sensor body 3, at a portion thereof where the sheath portion 4a is not formed, in particular, at a lower latera face of the sensor element accommodating portion 6b, there is formed in advance an engaging portion 8 in the form of a projection for use in preventing positional displacement of the sensor body 3 at the time of molding of the sheath portion 4a.

On the front and rear sides along the cable extending direction of the curved portion 7, with a virtual plane (see FIG. 5 and FIG. 6; referred to as the "virtual plane" hereinafter) Z including a cable centerline X of the first straight portion 2a and the second straight portion 2b located at the center thereof in the thickness direction, two reinforcing ribs 9a, 9b are formed integrally with the sheath portion 4a.

One reinforcing rib 9a is formed along an inner circumferential edge of the curved portion 7 and the other reinforcing rib 9b is formed along an outer circumferential edge of the curved portion 7.

In the rotation detection sensor A according to this embodiment, the sheath portion 4a with the sensor body 3 insert-molded therein is formed by one-time die molding operation, together with the fixing support portion 4b.

With the above, the relative position between the sensor body 3 and the fixing support portion 4b can be set with high accuracy. Consequently, the sensor element 1 can be assembled to a detection target, thus achieving high detection accuracy.

FIGS. 7-11 show a resin molding die C for injection molding according to this disclosure for use in die-molding the sheath portion 4a with the portion of the sensor body 3 and the curved portion 7 insert-molded therein, together with the fixing support portion 4b.

Figure 7:
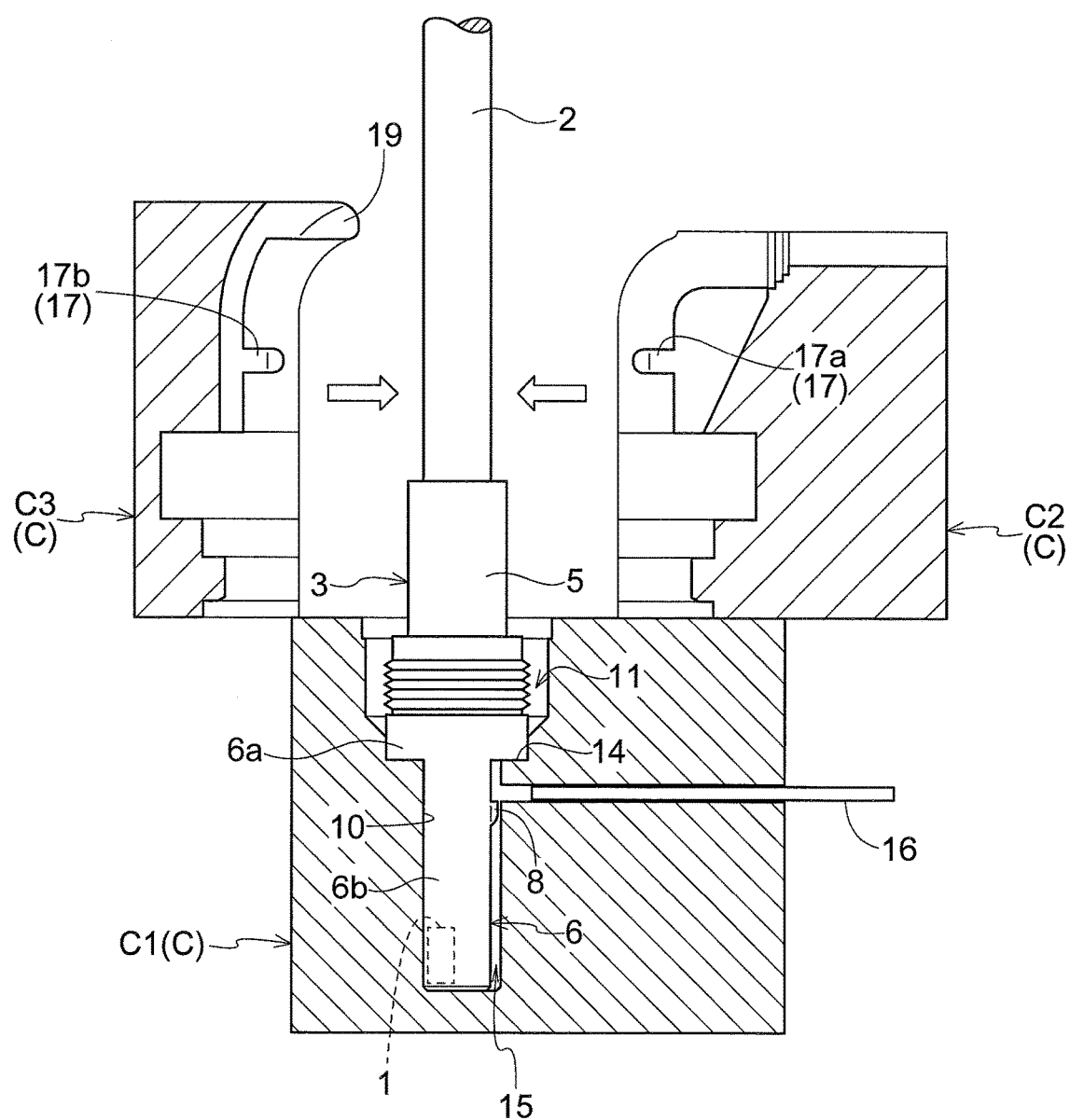
FIG. 7 is a section view showing a resin molding die.
Figure 8:
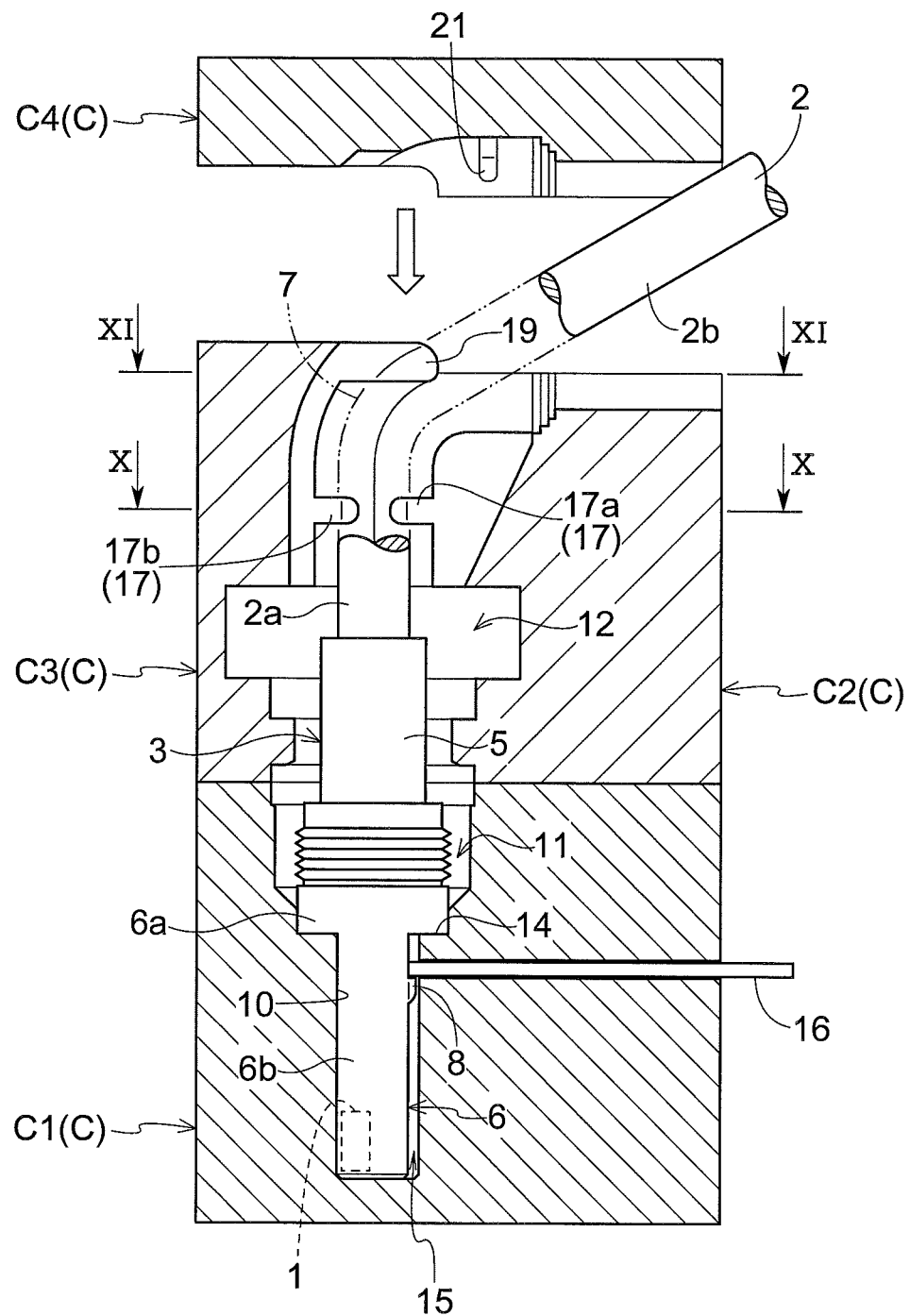
FIG. 8 is a section view showing the resin molding die.
Figure 9:
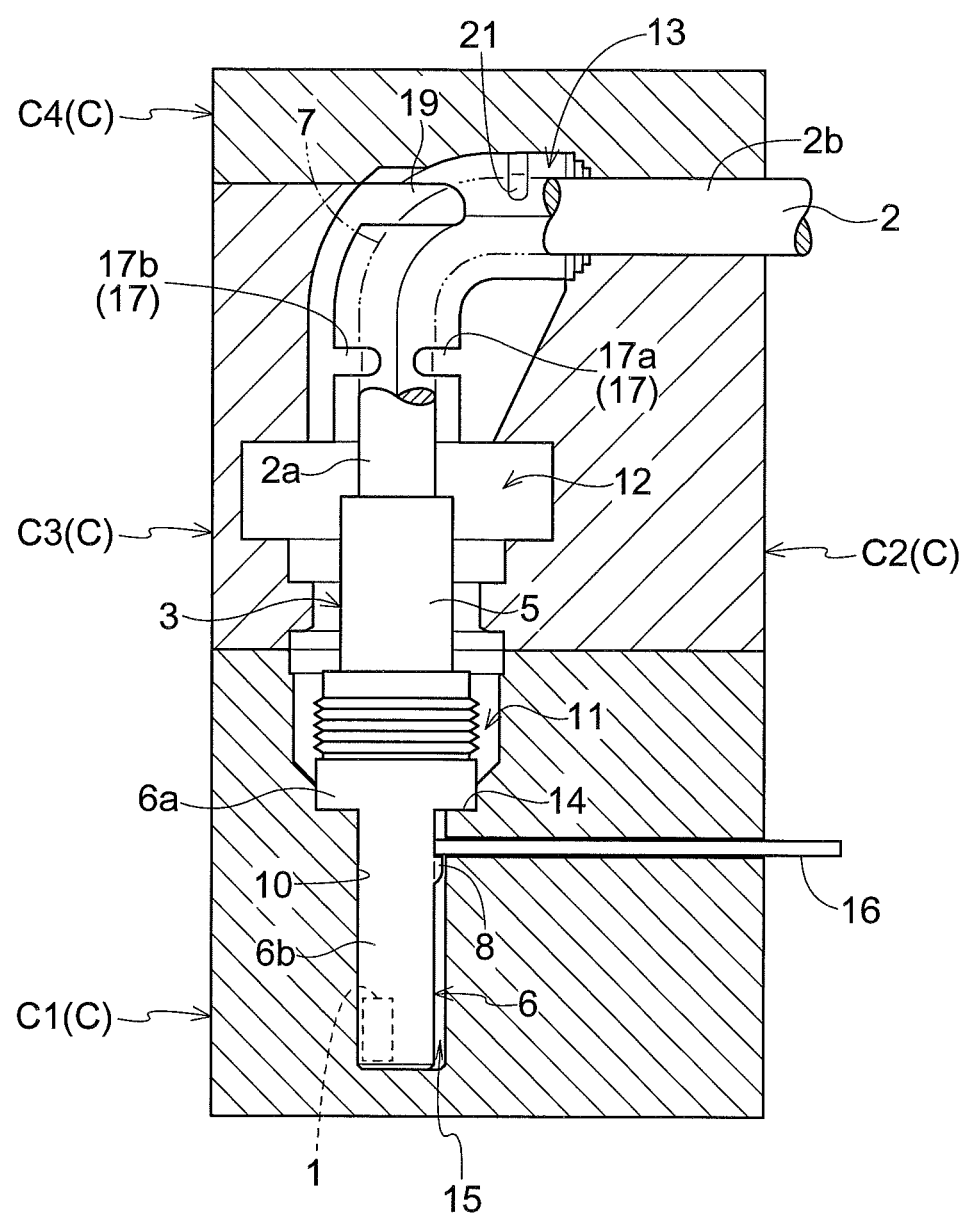
FIG. 9 is a section view showing the resin molding die.

The resin molding die C, as shown in FIGS. 7-9, include a first molding die C1 into which a case (corresponding to a leading end portion of the sensor body 3) 6 is to be fitted and fixed, a second molding die C2 and a third molding die C3 which are to enclose a portion of the holder 5 projecting from the case 6 (corresponding to a base end portion of the sensor body 3) and the cable 2, and a fourth molding die C4 which is to be clamped to the second molding die C2 and the third molding die C3 clamped together to form the curved portion 7 of the cable 2.

The first molding die C1, as shown in FIG. 7, defines a first cavity 11 which annularly surrounds the outer circumference of the cylindrical portion 6a, and a case holding hole 10 into which a lower portion of the cylindrical portion 6a and the sensor element accommodating portion 6b are inserted along the vertical direction is opened at the bottom of the first cavity 11.

At the portion of the case holding hole 10 which opens at the bottom of the first cavity 11, there is formed an engaging portion 14 configured to engage and hold the bottom of the cylindrical portion 6a at a fixed position.

As the bottom of the cylindrical portion 6a is engaged and held to the engaging portion 14, the leading end portion of the sensor body 3 to which the cable 2 is assembled is engaged and fixed to the first molding die C1.

The sensor element accommodating portion 6b is inserted in the case holding hole 10, with one lateral face thereof facing the inner face of the case holding hole 10 and with forming a gap 15 relative to the lateral face thereof in which the engaging portion 8 is provided.

The first molding die C1 holds a bar-like engaging member 16 with allowing projection and retraction of this engaging member 16 from/to the case holding hole 10, from a downstream side of withdrawal thereof from the case holding hole 10 relative to the engaging portion 8.

The engaging member 16 has its leading end urged to retract from the case holding hole 10 by means of an unillustrated urging member. In operation, when the leading end portion of the sensor body 3 is to be fitted and fixed to the first molding die C1, the engaging member 16 will project into the case holding hole 10 against the urging force, in association of e.g. expansion or contraction motion of an air cylinder, and will be held under an engageable state having a small gap relative to the engaging portion 8.

Incidentally, the engaging member 16 can be operatively linked with using e.g. a cam mechanism such that its leading end portion will protrude into the case holding hole 10 to come into engagement with the engaging portion 8 in association with movement of any one of the second through fourth molding dies C2, C3, C4 to the clamping side.

The second molding die C2 and the third molding die C3, as shown in FIG. 7 and FIG. 8, can be clamped to each other and be separated from each other, so as to form a second cavity 12 which annularly surrounds a portion of the holder 5 projecting from the cylindrical portion 6a and an outer circumference of a cable portion extending from the holder 5 and can be clamped also relative to the first molding die C1.

Therefore, the second molding die C2 is supported to be movable closer to the cable 2 from a downstream side of the cable 2 in the cable bending direction, whereas the third molding die C3 is supported to be movable closer to the cable 2 from an upstream side of the cable 2 in the cable bending direction.

The second molding die C2 and the third molding die C3 have a first holding portion 17 configured to hold straight a portion of the cable 2 which extends from the sensor body 3.

The first holding portion 17 is comprised of a first supporting portion 17a provided integrally in the second molding die C2 and a second supporting portion 17b provided integrally in the third molding die C3.

The first supporting portion 17a supports the cable 2 from its downstream side in the cable bending direction in association with a movement of the second molding die C2 closer to the cable 2 from the downstream side in the cable bending direction.

The second supporting portion 17b supports the cable 2 from its upstream side in the cable bending direction in association with a movement of the third molding die C3 closer to the cable 2 from the upstream side in the cable bending direction.

Figure 10:
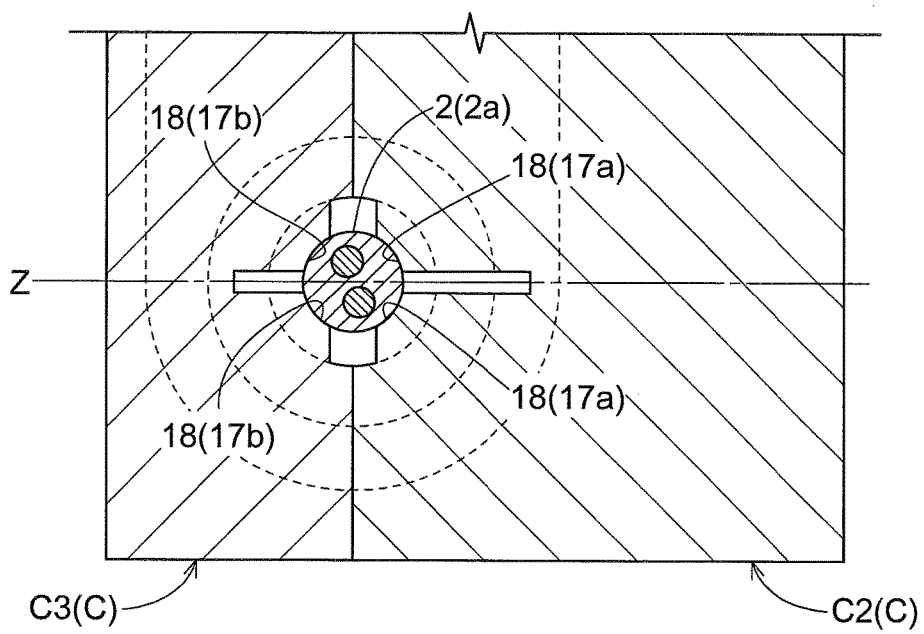
FIG. 10 is a section taken along a line X-X in FIG. 8.

Each one of the first supporting portion 17a and the second supporting portion 17b, as shown in FIG. 10, includes two abutment portions 18 spaced apart from each other along the cable circumference direction which come into abutment with the outer circumferential face of the cable 2.

The two abutment portions 18 are disposed to come into abutment with the outer circumferential face of the cable on the opposite sides across the virtual plane Z.

The third molding die C3 has a second holding portion 19 configured to hold the cable 2 with application of a bending force thereto such that the curved portion 7 is formed by a side of the cable 2 which extends further from its portion held by the first holding portion 17.

The second holding portion 19 holds the cable 2 with bending this cable toward the downstream side in the cable bending direction, in association with a movement of the third molding die C3 closer to the cable 2 from the upstream side in the cable bending direction.

Figure 11:
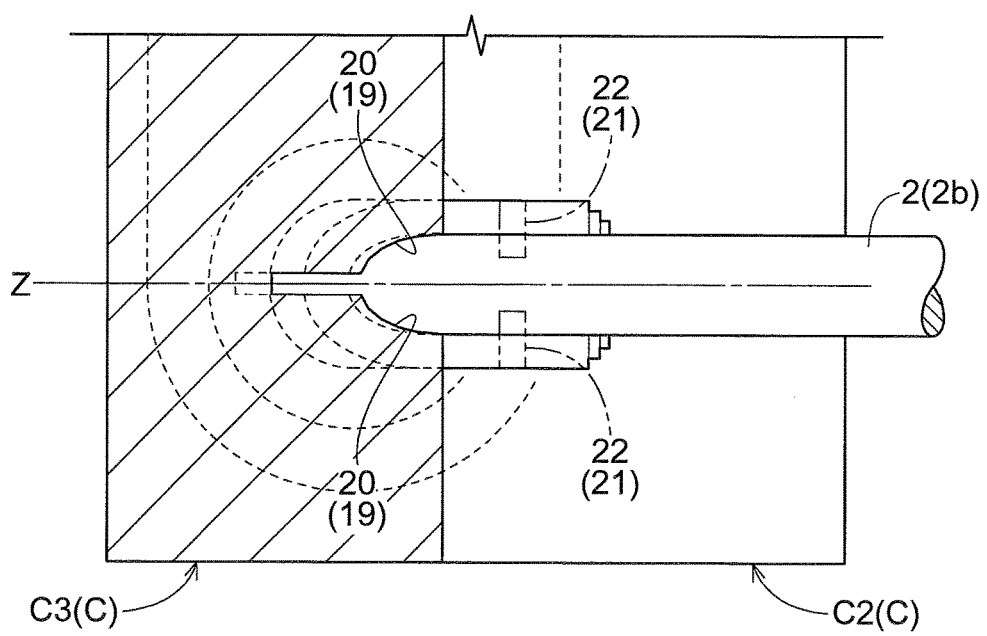
FIG. 11 is a section taken along a line XI-XI in FIG. 8.

The second holding portion 19, as shown in FIG. 11, includes two abutment portions 20 for pressing the outer circumferential face of the cable 2, with the two abutment portions 20 being spaced apart from each other in the cable circumferential direction.

The two abutment portions 20 are disposed to come into abutment to the cable outer circumferential face on the opposite sides across the upper reinforcing rib 9b, that is, on the opposite sides across the virtual plane Z.

The fourth molding die C4, as shown in FIG. 8 and FIG. 9, is configured to form a third cavity 13 for charging resin on the outer circumference of the cable 2, in cooperation with the second molding die C2 and the third molding die C3 clamped to each other, in association with a downward movement thereof closer to the second molding die C2 and the third molding die C3. And, the fourth molding die C4 clamps a portion of the cable 2 further extending from the curved portion 7, in cooperation with the second molding die C2.

The fourth molding die C4 has a third holding portion 21 configured to hold the cable 2 with application of a bending force thereto at a portion thereof further extending from the portion held by the second holding portion 19.

The third holding portion 21 further presses the cable 2 bent by the second holding portion 19 toward the second molding die C2, thereby forming the curved portion 7.

The third holding portion 21 includes two abutment portions 22 for coming into abutment to and pressing the outer circumference face of the cable 2, the two abutment portions 22 being spaced apart from each other in the cable circumferential direction.

The two abutment portions 22, as shown in FIG. 11, are disposed to come into abutment to the outer circumferential face of the cable on the opposite sides across the virtual plane Z, at positions spaced apart in the cable extending direction from the portion where the upper reinforcing rib 9b is to be formed.

And, as shown in FIG. 9, by injecting resin into the first through third cavities 11, 12, 13 formed to communicate to each other, the sheath portion 4a with the portion of the sensor body 3 and the curved portion 7 insert-molded therein can be molded together with the fixing support portion 4b.

Therefore, each one of the first holding portion 17, the second holding portion 19 and the third holding portion 21 is configured such that the respective abutment portions 18, 20, 22 thereof come into abutment to positions excluding positions of the cable 2 intersected by the virtual plane Z.

For this reason, as shown in FIG. 1 and FIGS. 3-6, in the sheath portion 4a, recesses 23 as marks resulting from holding of the cable 2 at the time of molding are formed at the positions on the opposite sides across the curved portion 7 along the extending direction of the cable 2 and excluding the positions intersected by the virtual plane Z.

INDUSTRIAL APPLICATION

The rotation detection sensor according to this disclosure can be used for detecting a rotational state of various kinds of rotational devices.

DESCRIPTION OF REFERENCE MARKS/NUMERALS

1: sensor element
2: cable
3: sensor body
4a: resin sheath portion
6: leading end portion (case)
7: curved portion
8: engaging portion
11, 12, 13: cavity
16: engaging member
17: first holding portion
19: second holding portion
21: third holding portion
23: recess
C1: first molding die
C2: second molding die
C3: third molding die
C4: fourth molding die
X: cable centerline of curved portion
Z: plane including cable centerline of curved portion (virtual plane

The invention claimed is:

1. A resin molding die comprising:
a first molding die configured to clamp and fix a leading end portion of an assembly type sensor body having a sensor element and a cable electrically connected to the sensor element;
second and third molding dies that enclose a base end portion of the sensor body and that can be clamped and separated to/from each other and that both can be clamped to the first molding die so as to form a cavity for charging resin to the base end portion and an outer circumferential portion of the cable; and
a fourth molding die that is clamped to the second and third molding dies clamped to each other to form a curved portion of the cable, the fourth molding die forming the cavity in cooperation with the second molding die and the third molding die, the fourth molding die clamping a portion of the cable further extending from the curved portion in cooperation with the second molding die,
wherein:
the second molding die and the third molding die have a first holding portion configured to hold straight a portion of the cable which extends from the sensor body;
the third molding die has a second holding portion configured to hold the cable with application of a bending force thereto such that the curved portion is formed by a side of the cable which extends further from its portion held by the first holding portion; and
the fourth molding die has a third holding portion configured to hold the cable with application of a bending force thereto at a portion thereof further extending from the portion held by the second holding portion.

2. The resin molding die according to claim 1, wherein the first through third holding portions are configured to come into abutment to positions in the cable excluding a position thereof intersected by a plane including a cable centerline of the curved portion.

3. The resin molding die according to claim 1, wherein there is provided an engaging member engageable/disengageable to/from an engaging portion formed in the sensor body, the engaging member being projectable/retractable from/into the first molding die when the leading end portion of the sensor body is fitted and fixed into the first molding die.

* * * * *